Feb. 5, 1952   J. A. HEALY   2,584,348
SELF-CLEANING HAND RAKE
Filed May 3, 1947   2 SHEETS—SHEET 1
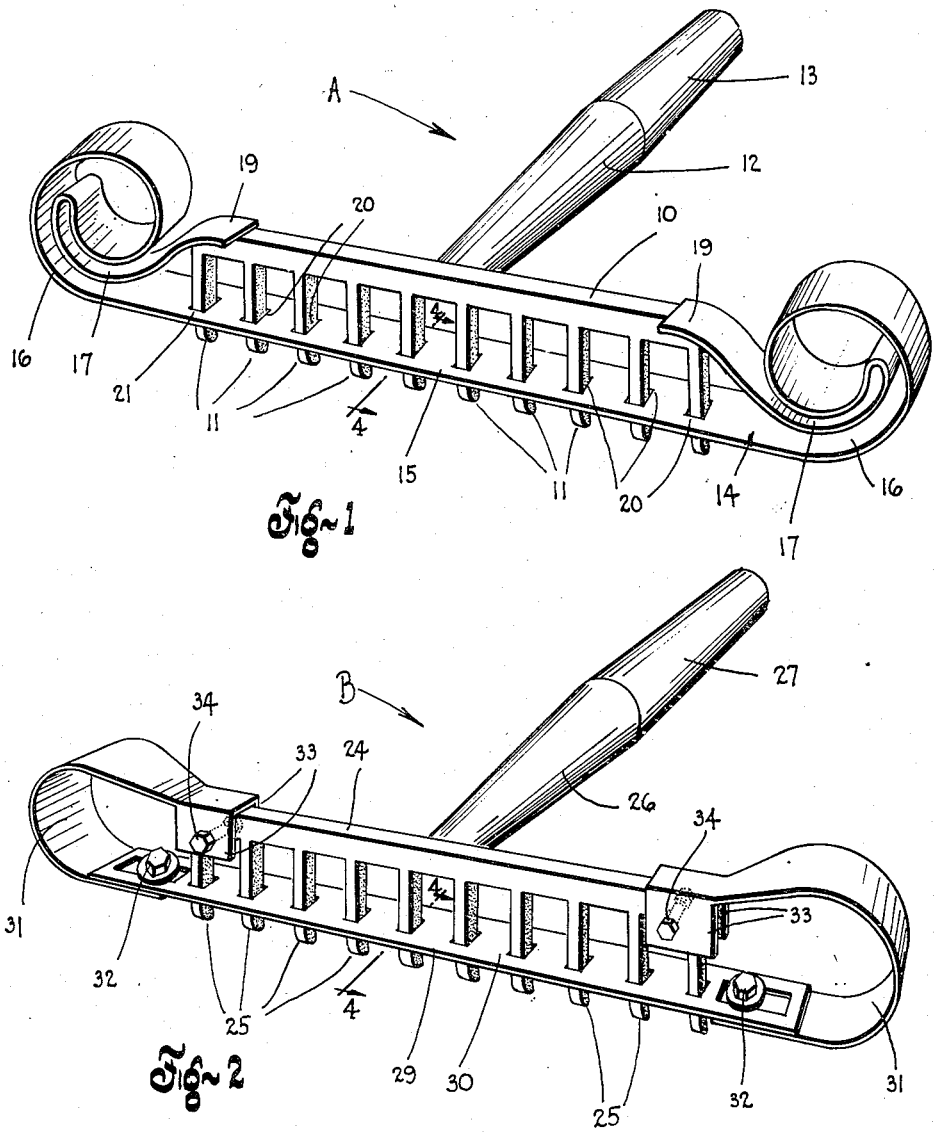

Feb. 5, 1952            J. A. HEALY            2,584,348
SELF-CLEANING HAND RAKE
Filed May 3, 1947            2 SHEETS—SHEET 2
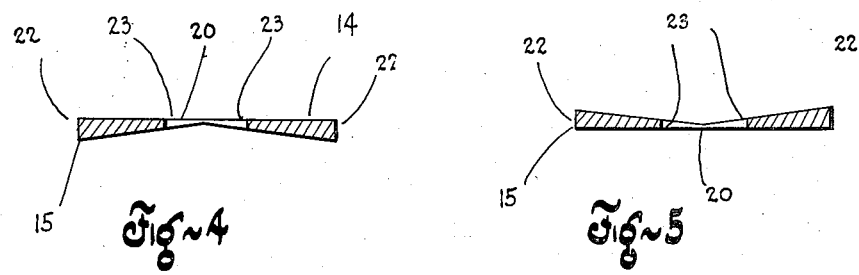
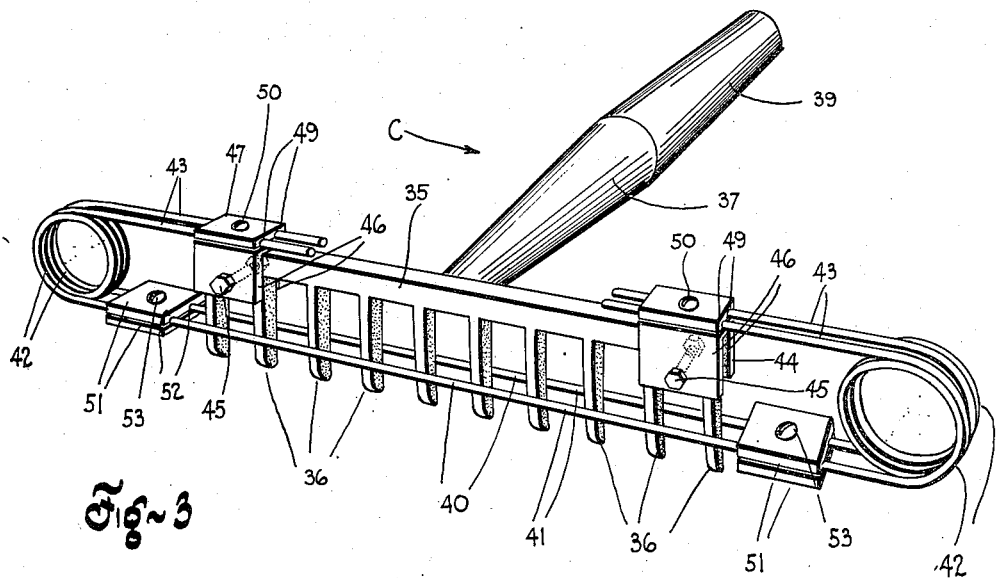
Inventor
John A. Healy
By Robert M. Dunning
Attorney Patented Feb. 5, 1952

2,584,348

UNITED STATES PATENT OFFICE 2,584,348

SELF-CLEANING HAND RAKE

John A. Healy, St. Paul, Minn., assignor of twenty-five per cent to John A. Healy, Jr., and twenty-five per cent to Edward James Healy, St. Paul, and twenty-five per cent to Mrs. W. F. Donais, Newport, Minn., and twenty-five per cent to Josephine Healy de Ruiz, Mexico City, Mexico Application May 3, 1947, Serial No. 745,832

4 Claims. (Cl. 56—400.08)

My invention relates to an improvement in rake wherein it is desired to provide a rake of the self-cleaning type.

In raking grass, leaves, weeds, or the like, the material being raked often becomes impaled upon the tines of the rake or wedged therebetween, lessening the efficiency of the rake. As a result it is necessary from time to time to dislodge the material on or between the prongs or tines of the rake in order to accomplish the desired task to the best advantage. Means have been provided for cleaning the material raked from the tines of the rake as it is used. Most such means, however, require manual manipulation or operation, thereby adding to the difficulty of the operation.

It is the object of the present invention to provide a rake equipped with a simple and effective means of stripping grass, leaves, weeds, or other material raked from the prongs or tines of the rake as it is used. This means operates automatically to remove the material raked from the tines. As a result the rake is kept free of foreign material during the raking operation.

A feature of the present invention resides in providing a stripping member designed to extend on both sides of a row of tines or teeth, and to resiliently urge material raked from the ends of these tines or prongs. This stripping means is resiliently supported by the rake and may be forced upwardly away from the free ends of the tines during the raking operation. However, as soon as the rake is lifted the resilient means supporting the stripping means forces the material clinging to the tines off the free ends of the tines.

A feature of the present invention resides in the provision of stripping means extending along both sides of a row of teeth or tines and in flexibly and resiliently connecting the ends of the rake. This flexible resilient means is simple in form and possesses sufficient spring to clean the rake while at the same time allowing the stripping means to move upwardly along the tines while the rake is being used.

A feature of the present invention lies in connecting the ends of the stripping means to the upper portion of the rake body by resilient loops which permit considerable flexibility of the stripping means. This connecting loop is of sufficient length to provide the necessary resilience without detracting from the normal operation of the rake.

These and other objects and novel features of my invention will be more clearly and fully set forth in the following specification and claims.

In the drawings forming a part of my specification:

Figure 1 is a perspective view of a rake showing my stripping means attached thereto.

Figure 2 is a perspective view similar to Figure 1 showing a detachable construction of a type suitable to fit rakes of various sizes and shapes.

Figure 3 is a perspective view of a modified form of construction.

Figure 4 is a cross sectional view through the stripping means shown in Figures 1 and 2 taken on the lines 4—4, the tine being removed.

Figure 5 is a cross sectional view through a modified form of construction from that illustrated in Figure 4.

The rake A, illustrated in Figure 1 of the drawings, includes a transverse rake bar or body 10 having a series of tines or teeth 11 extending downwardly therefrom. The tines or teeth 11 may be straight or may be curved to some extent, the particular formation of the teeth having little effect on the operation of the apparatus, unless the teeth be curved to a considerable extent. The rake bar or body 10 is provided with a ferrule or socket 12 projecting rearwardly therefrom at the desired angle. The socket 12 is designed to accommodate the rake handle 13, only a portion of which is illustrated in the drawing.

The stripping member comprises a flexible resilient strip 14 which includes a relatively flat center portion 15, a pair of looped ends 16, and inturned end portions 17 extending substantially parallel to the flat portion 14 and extending inwardly in opposed relation. Anchoring ends 19 are provided on the inwardly extending end members 17, these anchoring ends 19 being welded or otherwise affixed to opposite ends of the rake bar or body 10.

A series of holes 20 shaped to fit about the tines 11 are provided in the flat central portion 15 of the strip 14. These apertures 20 embrace the tines 11 and strip any material accumulated on the tines therefrom. The apertures 20 also serve to guide the strip 14 in its vertical movement holding the strip from longitudinal or transverse movement.

In preferred form the central portion 15 of the strip is tapered adjacent the apertures 20 to provide a thin cross section near these apertures as illustrated in Figure 4 of the drawings. The outer edges 22 of the strip portion 14 are relatively thick and the thickness of the strip decreases toward its center so as to provide a relatively narrow edge 23 about the apertures 20. Thus the bearing of the tines against the strip is reduced to a minimum so that little or no material may become wedged between the edges of the apertures and the tines.

As the rake A is used, leaves and other material tend to gather on the tines and between the same, beneath the stripping member 15. The loops 16 flex in a manner to allow the stripping member 15 to move away from the free ends of the tines or prongs. However, when the rake is lifted from contact with the ground the loop ends 16 possess sufficient resilience to urge the stripping member 15 downwardly to dislodge material clinging to or wedged between the tines.

In Figure 5 of the drawings I disclose a construction virtually identical with that of Figure 4, with the exception of the fact that the upper surface of the stripping member 15 is tapered rather than the lower surface thereof. However, in Figure 5, as in Figure 4, the strip 15 tapers from the widest section near the edges 22 thereof to a relatively thin section near the edges 23 of the aperture 20, or of the apertures 21.

The rake A is of a type which may be readily manufactured at an extremely low cost. In Figure 2 of the drawings I disclose a stripping attachment which may be used on conventional types of rakes, the stripping means being attached thereto. The rake B includes a rake bar or body 24 having a series of tines or prongs 25 extending downwardly therefrom. A socket 26 is secured to the body 24 in any suitable manner and acts as a means of supporting the handle 27.

The stripping means includes an elongated strip 29 having a hole 30 extending most of the length thereof. The holes 30 are of a size to accommodate the tines 25. The strip 29 may be of the cross sectional shape similar to the stripping member 15.

A spring look 31 of resilient material is secured to each end of the element 29 by means of a bolt or cap screw 32. The bolt or cap screw 32 extends through the holes 30 and holds the loop 31 and strip 29 assembled. Each loop 31 is provided with a pair of depending ears 33 designed to engage on opposite sides of the rake body 24. A bolt 34 extends through the plates 33 to hold the member engaged upon the rake.

The bolt 34 preferably extends beneath the bar 24 and between certain of the prongs 25, thus holding the loops from disengagement upon the rake.

The operation of the rake B is identical with that of the rake A. The stripping plate 29 and its attached end loops 31 may, however, be attached to virtually any standard rake and provide a stripping means therefor.

In Figure 3 of the drawings I disclose another form of stripping means which may be attached to any standard conventional rake. The rake C includes a rake body similar to that previously described and including a rake bar or body 35 having a series of prongs or tines 36 depending therefrom. A socket 37 is attached to the body 35 for accommodation of the handle 39, only a portion of which is illustrated.

The stripping means comprises a pair of spaced wires or rods 40 which extend on opposite sides of the tines or prongs 36. These rods 40 are similarly constructed and are formed of flexible and resilient material. Each of the wire members 40 includes a central straight portion 41 designed to extend throughout the width of the rake and slightly beyond the ends thereof. Loops 42 are provided at the ends of the straight portions 41, these loops terminating in inwardly turned end portions 43. The end portions 43 are sufficiently long to overlie the ends of the rake body 35.

A pair of channel-shaped elements 44 extend over the rake body bar 35 and are attached thereto by any suitable means, such as by a bolt 45 extending through the parallel sides 46 of each channel. Each bolt 45 preferably extends beneath the body bar 35 and between a pair of teeth 36 so as to hold the channel firmly in place.

A clamping plate 47 having a pair of elongated grooves 49 in the under-surface thereof overlie the channels 44 and are secured thereto by bolts or cap screws 50. Thus the stripping members 40 are terminally secured to the rake and extend on opposite sides of the tines 36 in parallel relation.

In order to hold the wires or rods 40 in parallel relation on opposite sides of the tines, I provide a pair of clamping plates 51 near each end of the straight portion 41 thereof. The clamping plates 51 are provided with parallel grooves 52 therein to accommodate the wires 40 and are clamped together by bolts or cap screws 53. The clamping plates 51 thus hold the intermediate straight portions 41 of the rods or wires 40 in parallel relationship and opposite sides of the tines 36.

The operation of the rake C is virtually identical with that of the rakes A and B. Material impaled upon the prongs or wedged between the same tends to raise the intermediate portions 41 of the stripping members 40 when the rake is in operation, but the resilience of the loop ends 42 tends to strip the material from the tines when the rake is elevated.

In accordance with the patent statutes, I have described the principles of construction and operation of my rake construction, and while I have endeavored to set forth the best embodiments thereof, I desire to have it understood that obvious changes may be made within the scope of the following claims without departing from the spirit of my invention.

I claim:

1. A stripping means for use in combination with a rake having an elongated rake body and having a series of parallel projecting teeth thereupon, the stripping means comprising a pair of spaced rods having a straight intermediate portion designed to extend on opposite sides of the tines of the rake, looped ends on said rods forming a plurality of convolutions having generally horizontal axes, means connecting the ends of said rods to the rake body, and means holding the intermediate portions of said rods in substantially parallel relationship.

2. A stripping device for a rake having an elongated bar and a series of prongs projecting therefrom, the device including an elongated element designed to extend on each side of the series of prongs, a flexible resilient loop means at each end of said elongated element to connect the elongated element to the corresponding end of the bar, said loop means comprising a plurality of convolutions having parallel axes substantially normal to a plane through the axes of the tines, and each convolution lying substantially in a plane through the axes of the tines.

3. A stripping device for a rake having an elongated bar and a series of parallel prongs projecting therefrom, the device comprising two similar guard elements extending along opposite sides of the prongs, the guard elements including a straight center portion, a convolute spring coil at each end thereof including one and one half convolutions extending to one side of a plane through said center portion and normal to the axes of the spring coils, and end portions on said spring coils substantially parallel to said straight center portion, means for securing said end portions to the ends of said bar, and means securing said straight center portions of the two guard elements in parallel relation on opposite sides of said prongs.

4. The structure defined in claim 3 in which the coil convolutions of both guard elements lie substantially in a plane through the axes of the prongs.

JOHN A. HEALY.

REFERENCES CITED

The following references are of record in the file of this patent:

UNITED STATES PATENTS

| Number | Name | Date |
|---|---|---|
| 394,521 | Thorp | Dec. 11, 1888 |
| 479,940 | Haldenian | Aug. 2, 1892 |
| 677,774 | Dawson | July 2, 1901 |
| 710,900 | Smith | Oct. 7, 1902 |
| 1,343,366 | Hinkle | June 15, 1920 |
| 1,648,284 | Seaton | Nov. 8, 1927 |
| 2,183,278 | Kelley | Dec. 12, 1939 |